United States Patent [19]

Shackle et al.

[11] Patent Number: 5,478,667
[45] Date of Patent: Dec. 26, 1995

[54] HEAT DISSIPATING CURRENT COLLECTOR FOR A BATTERY

[76] Inventors: Dale R. Shackle, 17135 Oak Leaf Dr., Morgan Hill, Calif. 95037; Jerry L. Morris, 207 Vineyard Dr., San Jose, Calif. 95119; Michael E. McAleavey, 358 Avenida Del Roble, San Jose, Calif. 95123

[21] Appl. No.: 968,154

[22] Filed: Oct. 29, 1992

[51] Int. Cl.⁶ .......................... H01M 10/50; H01M 6/18
[52] U.S. Cl. .......................... 429/120; 429/153; 429/162; 429/192
[58] Field of Search .................... 429/120, 162, 429/192, 178, 179, 153, 152, 156

[56] References Cited

U.S. PATENT DOCUMENTS

| | | | |
|---|---|---|---|
| Re. 24,408 | 12/1957 | Hack et al. | 429/153 |
| 1,737,130 | 11/1929 | Storey et al. | 429/162 X |
| 3,563,805 | 2/1972 | Deierhoi | 429/162 X |
| 3,674,562 | 4/1972 | Schneider et al. | 429/192 |
| 4,752,544 | 6/1988 | Gregory | 429/192 X |
| 4,925,751 | 5/1990 | Shackle et al. | |
| 5,001,023 | 3/1991 | Cheshire et al. | 429/192 X |

*Primary Examiner*—John S. Maples

[57] ABSTRACT

A current collector in electrical contact with an anode of a battery is extended beyond the anode to serve as a heat sink and presents a substantial surface area through which heat is dissipated from inside the battery to the atmosphere. When multiple battery cells are stacked, the current collectors extend to form fins across which air flows to efficiently dissipate heat.

3 Claims, 3 Drawing Sheets

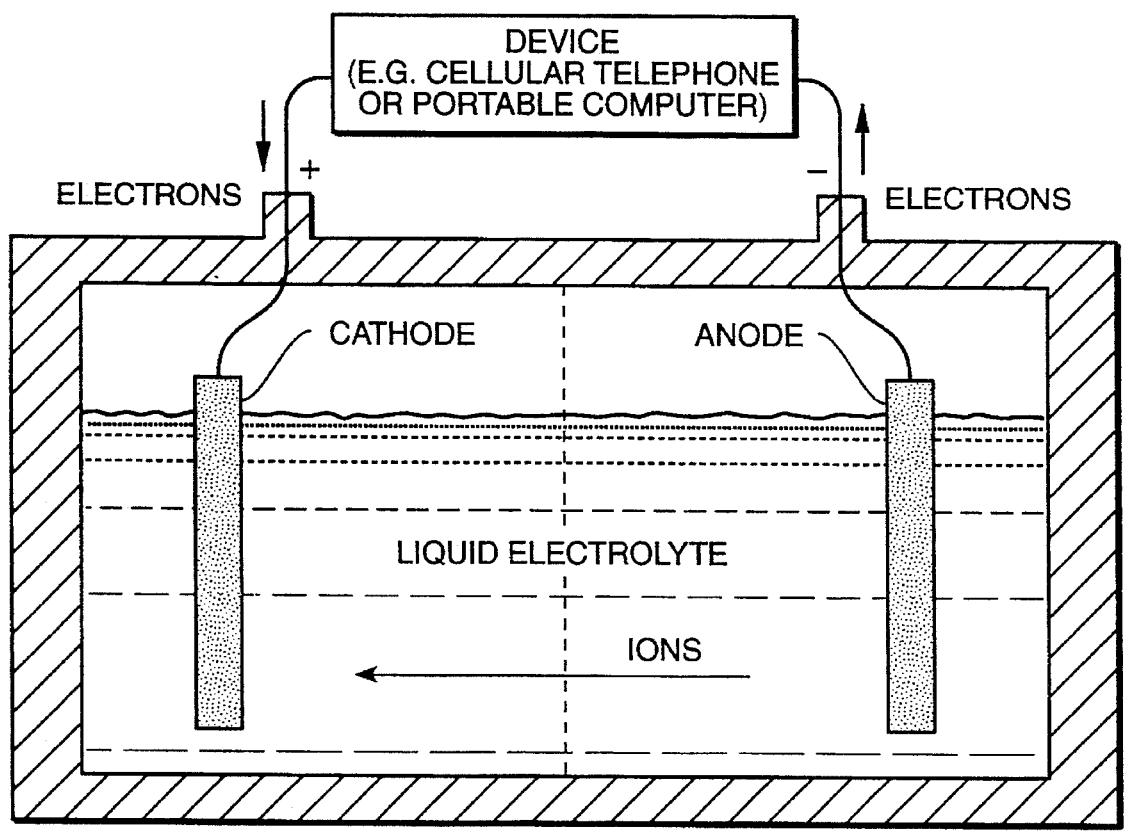
FIG._1
*(PRIOR ART)*

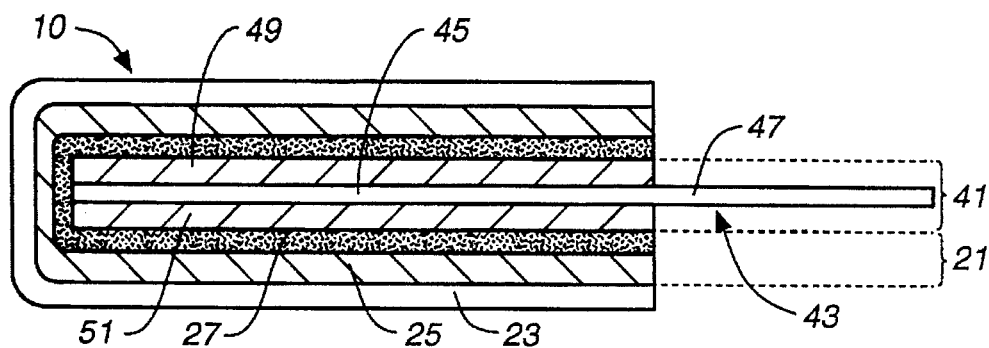
FIG._2
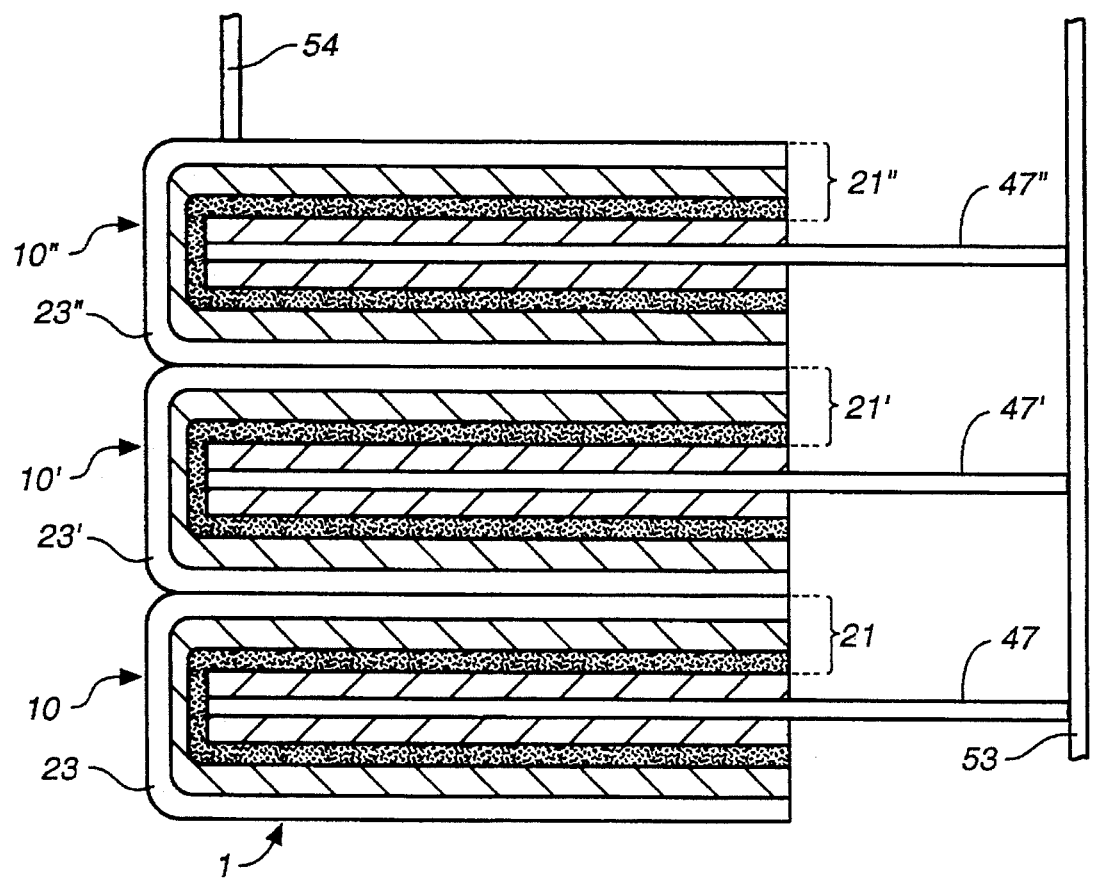
FIG._3

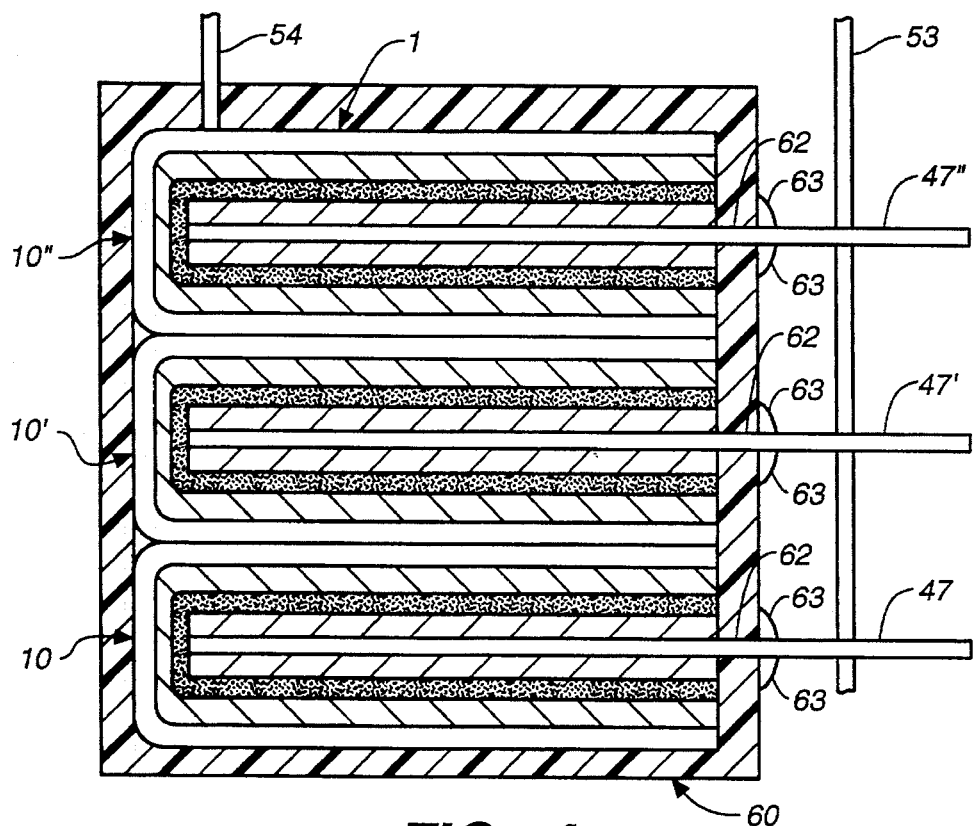
FIG._4
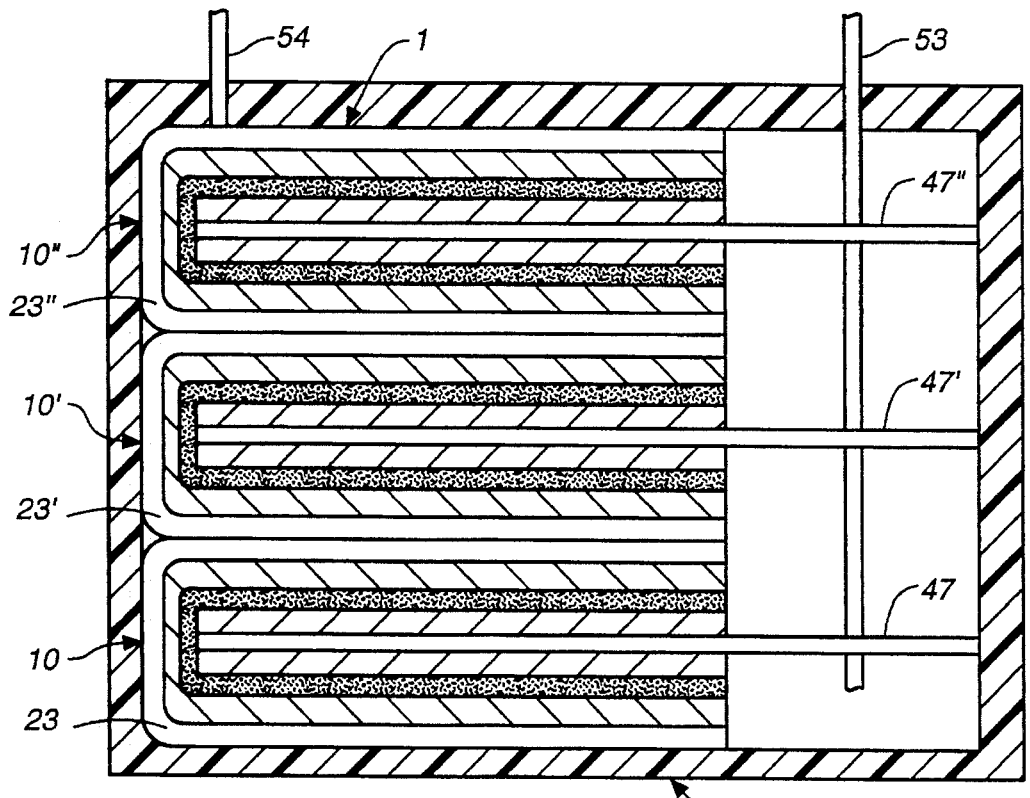
FIG._5

HEAT DISSIPATING CURRENT COLLECTOR FOR A BATTERY

BACKGROUND OF THE INVENTION

1. Field of the Invention

The present invention relates to the construction of batteries and, more particularly, to battery constructions that allow energy to be withdrawn from the battery quickly.

2. State of the Art

The basic structure and operation of a conventional battery such as a lead-acid battery may be understood with reference to FIG. 1. The main elements of the battery are the anode, the cathode and the electrolyte. The anode, on discharge, supplies a flow of electrons, constituting an electric current, to an external device. The current powers the external device and returns to the cathode. Within the battery, the anode and the cathode are separated by the electrolyte. The electrolyte acts as an electrical insulator preventing electrons from moving between the anode and the cathode inside the battery. However, the electrolyte allows the movement of ions, the remainder of the atom or molecule from which the electron has been released. As electrons are released from the anode to the device, ions are released from the anode, cross through the electrolyte and are stored in the cathode. During the recharge process, ions are transferred through the electrolyte back to the anode.

In conventional batteries, the electrolyte is liquid. Liquid electrolytes effectively allow the movements of ions between the anode and the cathode. However, the use of liquid electrolytes has several disadvantages. In most batteries, the liquid electrolyte contributes a substantial portion of the battery's overall weight. In addition, most electrolytes are composed of dangerous chemicals, including acid. In the event of a short circuit or other physical damage to the battery, the liquid electrolyte is free to flow to the reaction site and produce a continuous chemical reaction. This reaction may result in excess heat or a gas discharge, and if not properly released, may be explosive. Although batteries are sealed when manufactured, leaks can occur through misuse or a breakdown of the battery's packaging over time, posing a significant safety risk.

Polymer electrolyte batteries represent a new battery technology that differs significantly from conventional battery technology and promises significantly improved performance. Generally speaking, a polymer electrolyte battery includes an anode, such as a lithium metal anode, a single-phase, flexible solid polymer electrolyte, and a cathode that stores lithium ions. Unlike the liquid electrolyte used in most batteries, the electrolyte is a solid—thereby substantially reducing the weight and volume of the battery. To date, however, solid electrolyte lithium batteries have not been available commercially because such batteries have operated effectively only at high temperatures.

In either conventional or lithium polymer batteries, each of the battery components has some electrical resistance associated with it. The sum of these electrical resistances along a current flow path through the battery constitutes the internal electrical resistance of the battery. Because of the internal electrical resistance of the battery, normal use of a battery produces resistive heating. Although substantial resistive heating does not arise in most typical applications, difficulties can arise when very large lithium batteries, such as those used for powering electric vehicles, are operated at high rates of discharge. In such instances, the battery encloses a large volume such that the center of the battery pack is, in effect, thermally isolated from the battery's environment. Furthermore, such batteries are required to provide high currents (700 amperes or more for a starting battery). Under these circumstances, significant heat may be generated by resistive heating. If no measures are taken to dissipate the generated heat, the heat may, in the extreme case, gradually build up to such a degree as to cause an explosion.

To cool batteries and to prevent significant heat from being generated by resistive heating, it has been proposed that heat dissipation for a battery be accomplished by bathing the battery in water and pumping the water through a radiator. Such a cooling method, though effective, is very cumbersome and expensive. It has also been proposed to use vents and fuses to reduce battery heating problems. However, such measures are effective only after a battery has started to "run away." By that time, it may be too late to prevent an explosion.

Resistive heating problems can also arise in smaller batteries which are misused. Misuse of a battery can include, for example, short circuiting the battery by connecting its terminals directly to another, connecting the battery backwards, or recharging the battery with an incompatible device. Resistive heating problems may also occur through no fault of the user. For example, if the anode and cathode are spaced very close together, a dendrite in the form of a small metal burr may form between the anode and the cathode, causing excessive heating.

SUMMARY OF THE INVENTION

The present invention generally relates to a battery construction that allows energy to be quickly withdrawn from the battery. More particularly, a battery constructed according to the present invention includes a current collector structure that allows energy to be withdrawn from the battery quickly while partitioning a reactive material into two smaller masses that are isolated from one another. More particularly, a current collector in accordance with the present invention is provided in conjunction with an anode to extend outside the housing of the battery to provide a substantial surface area over which heat may be dissipated from the battery to the surrounding atmosphere.

In accordance with one aspect of the present invention, a battery comprises a battery cell. The battery cell includes an electrode, an second potential electrode in electrical contact with a sheet-like second potential electrode current collector, and an electrolyte in contact with the electrode and the second potential electrode. An extended portion of the second potential electrode current collector extends beyond the second potential electrode for dissipating heat from inside the battery to the atmosphere.

In accordance with another aspect of the present invention, the electrode is a laminate including electrode material in electrical contact with a sheet-like electrode current collector. The second potential electrode is in electrical contact with the second potential electrode current collector on two sides of the second potential electrode current collector. The laminate is folded around the second potential electrode and the second potential electrode current collector such that the electrolyte is in contact with the second potential electrode on two sides of the second potential electrode current collector. The extended portion of the second potential electrode current collector extends from between the folded laminate.

BRIEF DESCRIPTION OF THE DRAWINGS

The present invention can be further understood with reference to the following description in conjunction with the appended drawings, wherein like elements are provided with the same reference numerals. In the drawings:

FIG. 1 is a diagrammatic view of a conventional battery;

FIG. 2 is a schematic, cross-sectional view of a battery cell according to an embodiment of the present invention;

FIG. 3 is a schematic, cross-sectional view of a battery composed of multiple battery cells according to the present invention;

FIG. 4 is a schematic, cross-sectional view of a battery composed of multiple battery cells and enclosed in a housing according to an embodiment of the present invention; and FIG. 5 is a schematic, cross sectional view of a battery composed of multiple battery cells and enclosed in a housing according to an embodiment of the present invention.

DETAILED DESCRIPTION OF THE PREFERRED EMBODIMENTS

As shown in FIG. 2, a battery cell 10 includes a folded electrode laminate sheet 21 having a current collector layer 23, an electrode layer 25 laminated on the current collector layer, and an electrolyte layer 27 laminated on the electrode layer. The current collector layer 23, the electrode layer 25, and the electrolyte layer are laminated together such that the current collector layer is in electrical contact with the electrode layer, and the electrode layer is in electrical contact with the electrolyte layer. In accordance with the preferred embodiment, the electrode laminate sheet 21 is referred to herein as the cathode laminate, the current collector layer 23 is referred to herein as the cathode current collector layer, and the electrode layer 25 is referred to herein as the cathode layer. The current collector layer 23 is provided to inject electrons into the cathode layer 25 which, by itself, is generally a relatively poor conductor. The current collector layer 23 also facilitates forming an electrical connection with the cathode laminate 21 in that an electrical connection can be made directly with the current collector layer.

The cathode current collector layer 23 is sheet-like and is preferably formed from a continuous current conducting web material, such as a nickel web or sheet. The cathode layer 25 is coated onto the cathode current collector layer 23 and is selected from the group of materials suited for storing ions released from an anode. The cathode layer 25 is preferably a composite material including a vanadium oxide $V_6O_{13}$ or $LiV_3O_8$ material. The electrolyte layer 27 is a polymer electrolyte material that is coated onto the cathode layer 25. The cathode layer 25 and the electrolyte layer 27 can be cured in an electron beam curing apparatus (not shown).

An second potential electrode laminate 41 includes a second potential electrode current collector layer 43 having a first portion 45, to which is applied a top and a bottom layer 49, 51 of second potential electrode material, and a second, extended portion 47. In accordance with the preferred embodiment, the second potential electrode laminate 41 is referred to herein as the anode laminate, the second potential electrode current collector layer 43 is referred to herein as the anode current collector layer, and the top and bottom layers 49, 51 of second potential electrode material are referred to as the top and bottom anode layers.

The anode current collector layer 43 is sheet-like and is preferably formed from a continuous current conducting web material, such as a nickel or copper web or sheet. The top and bottom anode layers 49, 51 preferably include anode material that is applied to the first portion 45 of the anode current collector 43 by chemical vapor deposition or some other suitable deposition process such that the top and bottom anode layers are in electrical contact with the anode current collector. Alternatively, the top and bottom anode layers 49, 51 can include sheets of anodic foil applied to the anode current collector 43 such that the top and bottom anode layers are in electrical contact with the anode current collector, or the anode laminate 41 can be formed from a sheet of anodic foil. Lithium is a particularly preferred anodic material because of its position in the electromotive series.

The cathode laminate 21 is folded evenly around the anode laminate 41 such that the layer of electrolyte material 27 on the cathode laminate 21 contacts the top and bottom anode layers 49, 51, thereby forming the battery cell 10. Preferably, the cathode laminate 21 is of sufficient size such that, when the cathode laminate is folded around the anode laminate 41, the top and bottom layers 49, 51 of anode material are completely covered by the cathode laminate. Preferably, all of the extended portion 47 of the anode current collector layer 43 extends outwardly from between the folded cathode laminate 21; however, the cathode laminate can extend over a portion of the extended portion of the anode current collector layer.

As shown in FIG. 3, a plurality of battery cells 10, 10', 10" are stacked on top of one another such that a portion of the cathode current collector layer 23 of the cathode laminate 21 of each cell contacts, and is thereby electrically connected to, a portion of the cathode current collector layer of every other cell. In this manner, a plurality of cathode layers 25 are electrically connected to one another.

The plurality of battery cells 10, 10', 10" are preferably stacked such that each of the extended portions 47 of each of the anode laminates 41 of each cell extend in the same direction. As shown in FIG. 3, aligning all the battery cells in the same direction facilitates electrically connecting all of the discrete anode laminates 41 to one another by an electrical connector 53. In the alternative, the plurality of battery cells 10, 10', 10" can be arranged in alternatingly opposite directions (not shown). The electrical connector 53 is preferably a conductive strip, such as a piece of copper wire or sheet, which is electrically connected to each of the extended portions 47 of each anode laminate 41, such as by welding, soldering or by being fused to the extended portions by a chemical reaction. The cathode laminates 21, 21', 21" of the plurality of battery cells 10, 10', 10" are electrically connected to one another by contact of the conductive cathode current collectors 23, 23', 23" with one another. The cathode laminates 21, 21', 21" are electrically connected to an outside load or power source by an electrical connector 54 contacting an exposed portion of one of the cathode current collectors 23, 23', 23".

When multiple cells 10, 10', 10" are joined together to form a battery pack 1, as shown in FIG. 4, the extended portions 47 of the anode current collectors 43 of the cells extend parallel to one another, thereby forming a finned heat sink structure. Air flow across the extended portions 47 of the anode current collectors 43 permits heat from the reactive core of the battery, the lithium anode layer 49, 51, to be rapidly dissipated. Air flow can be provided by natural or forced convection. Heat conduction from the extended portions 47 of the anode current collector 43 allows the top and bottom lithium layers 49, 51 to be maintained at a low, stable operating temperature.

One or more battery cells 10 can be enclosed in a housing 60, as shown in FIGS. 4 and 5, which can be rigid or flexible. In the housing 60 shown in FIG. 4, the extended portions 47 of the anode current collectors 43 extend through a wall 61 of the housing, thereby facilitating forming electrical connections with the anode laminate 41 as well as facilitating blowing cooling air over the extended portions to maintain the battery cells 10, 10', 10" at a proper operating temperature. A preferred flexible housing 60 includes a shrink wrap material wrapped around the battery pack 1. Edges 62 of the shrink wrap material where the extended portions 47 of the anode current collectors 43 extend through the wall 61 of the housing 60 are sealed, preferably with a hot melt adhesive 63. Sealing the battery pack 1 in the foregoing manner helps to prevent damage to the battery cells 10 that might occur due to exposure to the elements; particularly exposure to water, which is highly reactive with many anode materials such as lithium.

As shown in FIG. 5, the battery pack 1 can be enclosed in a housing 60 such that the extended portions 47 of the anode current collectors 43 are enclosed within the housing. A portion of the electrical connector 53 extends outside of the housing 60 so that the anode laminates 41 of the battery cells 10, 10', 10" can be connected to a load or a power source (not shown). The housing 60 is preferably selected such that open spaces are provided near the extended portions 47, 47', 47" of the battery cells 10, 10', 10" to permit internal ventilation of the battery cells.

The above-described battery cell 10 provides significant advantages. For example, by depositing lithium on the current collector 43, the thickness of the anode laminate 41, and of the top and bottom anode layers 49, 51 is able to be carefully controlled. In a typical application, lithium anode layers 49, 51 of 5 to 15 microns in thickness are sufficient, depending on the capacity of the cell. Lithium foils, on the other hand, are not presently known to be commercially available in thicknesses less than about 75 microns. Using a lithium foil anode 75 microns thick in an application where a layer of lithium of only 5 to 15 microns thick would normally suffice results in a several-fold excess of lithium.

By depositing the lithium material on the first portion 45 of the current collector 43 in only the required thickness for the top and bottom anode layers 49, 51, the concentration of lithium in the battery can be reduced, reducing expense, enhancing safety, and not least of all, reducing the volume of the battery cell 10. Furthermore, the current collector 43 effectively partitions the battery cell 10, dividing the top and bottom anode layers 49, 51 into separate portions and forming a sort of reaction barrier between those separate portions. A potential problem in one part of the battery cell 10 is, therefore, less likely to affect other parts of the battery cell.

Thus, it can be appreciated that the above-described battery provides a means for efficiently removing sufficient heat from a battery cell 10 or a battery pack 1 to reduce risks due to explosions. This is done, as described above, by providing a heat sink in the form of thin metal foil current collector 43 that has been coated, on a first portion 45, with lithium or other active metal. A second portion 47 of the current collector 43 acts as a heat sink and radiator to maintain a low temperature in the interior of a battery cell 10. The second portion 47 of the metal foil current collector 43 also provides a convenient method for removing current from the battery cell 10 at high rates.

The foregoing principles can be applied advantageously in batteries having designs other than the above-described folded cell design. Also the foregoing principles can be applied in batteries using other anode materials, such as sodium, magnesium, or some other active metal. Accordingly, although the foregoing has described the principles, preferred embodiments and modes of operation of the present invention, the invention should not be construed as limited to the particular embodiments discussed. Instead, the above described embodiments should be regarded as illustrative rather than restrictive, and it should be appreciated that variations may be made in those embodiments by workers skilled in the art without departing from the scope of the present invention as defined by the following claims.

What is claimed is:

1. A battery comprising:

a battery cell including an electrode a second potential electrode in electrical contact with a sheet shaped second potential electrode current collector and an electrolyte in contact with the electrode and the second potential electrode; and an extended portion of the second potential electrode current collector extending beyond the second potential electrode for dissipating heat from inside the battery to the atmosphere, wherein the electrode is a laminate including electrode material in electrical contact with a sheet shaped electrode current collector and wherein the second potential electrode is in electrical contact with the second potential electrode current collector on two sides of the second potential electrode current collector, the laminate is folded around the second potential electrode and the second potential electrode current collector such that the electrolyte is in contact with the second potential electrode on two sides of the second potential electrode current collector, the extended portion of the second potential electrode current collector extending from between the folded laminate.

2. The battery of claim 1, wherein the electrolyte is laminated on the electrode material.

3. The battery of claim 1, wherein the second potential electrode includes anode material less than fifteen microns thick, which material is mounted on each side of the second potential electrode current collector.

* * * * *